United States Patent [19]
Walter

[11] 3,897,258
[45] July 29, 1975

[54] REFRACTORY SILICEOUS CEMENTS AND THEIR METHOD OF PRODUCTION

[76] Inventor: Liviu Walter, 11 Impasse Houssay, 92 Neuilly-sur-Seine, France

[22] Filed: Aug. 31, 1973

[21] Appl. No.: 393,574

Related U.S. Application Data

[63] Continuation of Ser. No. 165,404, July 22, 1971, abandoned.

[30] Foreign Application Priority Data

Aug. 4, 1970  France .............................. 70.28783

[52] U.S. Cl. ..................... 106/85; 106/89; 106/100; 106/104
[51] Int. Cl................................................ C04b 1/00
[58] Field of Search ................ 106/85, 89, 100, 104

[56] References Cited
OTHER PUBLICATIONS

Lea & Desch, The Chemistry of Cement and Concrete, Ed. Arnold (Pub.) Ltd., London, 1956, p. 472.

*Primary Examiner*—J. Poer

[57] ABSTRACT

This invention relates to refractory siliceous barium cements characterised in that their clinkers have a chemical composition expressed in oxides of : 75 to 82 % BaO, 14 to 17 % $SiO_2$, less than 3.5 % $Al_2O_3$, less than 1.5 % $Fe_2O_3$, less than 2 % CaO, less than 1 % MgO, less than 1 % $Na_2O + K_2O$, for a total of 100 %, all percentages being by weight, and the utilisation of these cements for producing refractory concretes.

5 Claims, No Drawings

REFRACTORY SILICEOUS CEMENTS AND THEIR METHOD OF PRODUCTION

This is a continuation of application Ser. No. 165,404 filed July 22, 1971 now abandoned.

This invention concerns new refractory siliceous cements and their method of production. For the preparation of refractory concretes, i.e., concretes resisting temperatures above 1,500°C, refractory cements are used. These cements are aluminous cements, very poor in fluxes, based on calcium dialuminate and calcium monoaluminate.

Such cements have a very high refractoriness (from 1,600° to 1,750° C for instance), but they present two main disadvantages:
a. they have a high cost price,
b. they have a relatively poor behaviour concerning their softening under load at high temperature when they are used with refractory granulates made from crushed aluminosilicate fire-bricks containing less than 40 % $Al_2O_3$, with sillimanite — or mullite granulates and especially when they are used with very porous siliceous granulates for insulating concretes.

At present, refractory siliceous barium cements based on dibarium silicate are unknown.

This invention concerns, as new products, refractory siliceous barium cements. The refractory siliceous barium cements based on dibarium silicate are manufactured according to this invention, by baking to vitrification or fusion (1,500° to 1,700°C) a homogeneous mixture of very fine powders of raw materials containing mainly barium, silicon and oxygen, and are characterised in that their clinkers have a chemical composition, expressed in oxides, of 75 to 82 % BaO, 14 to 17 % $SiO_2$, less than 3,5 % $Al_2O_3$, less than 1,5 % $Fe_2O_3$, less than 2 % CaO, less than 1 % MgO, less than 1 % $Na_2O$ + $K_2O$, for a total of 100 %, all percentages being by weight.

The cement clinkers, according to the invention, have a mineralogical constitution, expressed in hydraulic constituents of 70 to 90 % dibarium silicate, $2BaO . SiO_2$, as hydraulic main-constituent and of:
less than 8 % monobarium silicate; $BaO . SiO_2$,
less than 8 % monobarium aluminate, $BaO . Al_2O_3$,
less than 8 % tetrabarium aluminateferrite, $4BaO . Al_2O_3.Fe_2O_3$,
less than 12 % calcium-barium orthosilicate, $CaO . BaO . SiO_2$,
together with magnesium-barium orthosilicate, $MgO . BaO . SiO_2$, as hydraulic secondaray constituents.

To the cement clinker, according to the invention, there is added, during the very fine grinding, an additional compound intended to slow down the setting of this cement. It was ascertained in fact that the setting of this cement is otherwise too rapid and that it is of interest, as is the case, for instance, with the portland cement, to add a setting-retarder. Calcium sulfate or gypsum in quantities of about 3 to 5 % or 3 to 5 % gypsum together with 5 % bentonite are used to this end.

It is also possible to add other additives known per se.

This invention also concerns the methods of producing cement-clinkers and cements according to the invention. These methods are characterised in that the raw materials containing mainly barium silicon and oxygen, are very finely ground to powders, then admixed and homogenised, the relative quantities of the powders being chosen so as to assure, by baking, the formation of dibarium silicate as main- constituent of the cement-clinker.

According to the invention, barytes ($BaSO_4$) or siliceous barytes and clay or siliceous clay are preferably used as raw materials. If these raw materials do not contain sufficient silica, the necessary quantity of silica in the form of very fine siliceous sand, for instance, is added to the mixture.

Where barytes or siliceous barytes are used as raw materials, the method of production leads, according to the invention, to the formation of $SO_2$ and $SO_3$. These oxides are obviously recuperated to be put to value according to known methods.

If the refractory siliceous barium cements are produced simultaneously with sulphur oxides for the manufacture of sulfuric acid and its derivatives, the use of barytes becomes economical because its desulfatation in the raw material mixtures is greatly facilitated, occurring at lower temperatures (reactions in solid state), and because, under these conditions, the general production costs diminish substantially.

The refractory siliceous barium cements based on dibarium silicate, according to the invention, present the following advantages in comparison with the refractory aluminous cements based on calcium monoaluminate and calcium dialuminate:

they are cheaper, the barytes having a lower cost price than the artificial alumina or the very pure natural hydrated alumina;

they have higher mecanical strengths 24 hours after mixing with water:

their hydration takes place with lower water quantities, thus leading to lower porosities after hardening and smaller contractions after calcination:

they do not expand during setting and consequently can be rapidly removed from the shuttering.

As hydraulic binders for refractory mortars and concretes with refractory granulates made from crushed alumino-silicate bricks containing less than 40 % $Al_2O_3$, with sillimanite or mullite granulates and for insulating concretes with very porous siliceous granulates of expanded fireclays for instance, they can be used at higher temperatures of 100° to 150 °C because of their superior resistance to softening under load at high temperature.

Ground and homogenised with 20 to 70 % by weight, of basic or acid high furnace slag, poor in $Al_2O_3$, they can be used as unequalled sulfate-resisting cements or sea water cements.

Ground and homogenised with 30 to 60 % barytes, they can be used as shielding cements of great value, absorbing X- and gamma-radiations.

The following non limiting example illustates this invention without however limiting its scope.

EXAMPLE 91 parts by weight of siliceous barytes and 9 parts by weight of siliceous clay are very finely ground, then admixed and homogenised. The raw materials used have the following chemical composition:
Siliceous barytes: 4.52 % $SiO_2$, 0.78 % $Al_2O_3$, 0.42 % $Fe_2O_3$, 0.56 % CaO, 61.08 % BaO, 0.35 % MgO, 0.26 % alkalis, 31.84 % $SO_3$, 0.41 % $CO_2$;
Siliceous clay: 73.95 % $SiO_2$, 12.58 % $Al_2O_3$, 5.81 % $Fe_2O_3$, 0.92 % CaO, 0.47 % MgO, 0.90 % alkalis, 5.66 % loss on ignition.

The above mixture is baked until clinkers are formed (at 1,500° to 1,600°C) in a usual cement furnace. After cooling, the resulting cement clinker is ground as finely as artificial Portland cement together with 4.5 of gypsum as setting retarder.

The raw material mixture contains 23 % $SO_2$, which emanates during formation of clinkers and is recuperated to be then used according to known methods.

The refractory siliceous cement clinker resulting from the above method of production has the following chemical composition:
15.30 % $SiO_2$, 2.62 % $Al_2O_3$, 1.29 % $Fe_2O_3$, 0.84 % CaO, 78.99 % BaO, 0.51 % MgO, 0.45 % alkalis.

Its mineralogical constitution is: 77.10 % dibarium silicate, $2BaO . SiO_2$, as main constituent and 3.63 % monobarium silicate, $BaO . SiO_2$, 4.51 % monobarium aluminate, $BaO . Al_2O_3$, 7.06 % tetrabarium aluminateferrite, $4 BaO . Al_2O_3 . Fe_2O_3$, 4.04 % calcium-barium orthosilicate, $CaO . BaO . SiO_2$, 3.21 % magnesium-barium orthosilicate, $MgO.BaO.SiO_2$, as secondary constituents and 0.45 % alkalis, free and included in the barium-belite (mineralised dibarium silicate).

Without gypsum, the setting of this cement is very rapid. With the very finely ground and homogenised addition it becomes normal. Its hardening is very rapid (high mechanical strengths 24 hours after mixing with water).

It has a refractoriness of 1,670°C, and its compressive strengths, after 12 hours in humid air and then in water, are the following:
  450 kg/cm² after 24 hours,
  600 kg/cm² after 3 days,
  660 kg/cm² after 7 days, and
  730 kg/cm² after 28 days.

The refractory concrete prepared from 15 % of cement and 85 % of refractory granulates made from crushed aluminosilicate brick containing 30.2 % $Al_2O_3$, having 16 % of the total weight of the concrete granules of less than 0.2 mm, 32 % granules between 0.2 and 2 mm and 32 % granules between 2 and 5 mm, has a refractoriness of 1,630°C. The refractoriness under load of 2 kg/cm² of the refractory concretes realised with this refractory siliceous barium cement together with refractory granulates made from crushed aluminosilicate fireclay bricks containing 30.2 % $Al_2O_3$, having the above granulation, is 1,330°C, 120°C higher than the refractoriness under load of the corresponding refractory concretes realized with the refractory aluminous cements based on calcium monoaluminate and calcium dialuminate, which is only of 1,210°C. This results in consequence in a much greater field of use for these less refractory concretes and in a lower cost price.

I claim:

1. A refractory siliceous barium cement containing as the major constituent dibarium silicate and comprising as minor constituents monobarium silicate, monobarium aluminate, tetrabarium aluminate ferrite, calcium-barium orthosilicate and magnesium-barium orthosilicate, said constituents being present in such proportions that the cement in its clinker stage contains by weight from 75 to 82% BaO, from 14 to 17% $SiO_2$, less than 3.5% $Al_2O_3$, less than 1.5% $Fe_2O_3$, less than 2% CaO, less than 1% MgO and less than 1% alkalis.

2. Method of producing refractory siliceous barium cement clinkers containing as the major constituent dibarium silicate and comprising as minor constituents monobarum silicate, monobarium aluminate, tetrabarium aluminate ferrite, calcium-barium orthosilicate and magnesium-barium orthosilicate in such proportions as to provide from 75 to 82% BaO, from 14 to 17% $SiO_2$, less than 3.5% $Al_2O_3$, less than 1.5% $Fe_2O_3$, less than 2% CaO, less than 1% MgO and less than 1% alkalis which comprises baking to vitrification a homogeneous mixture of very fine powders containing a source of barium, silicon, and oxygen in sufficient quantity and relative proportions to permit the formation upon vitrification of 70 to 90%, by weight, of dibarium silicate.

3. A refractory siliceous barium cement which contains from 70 to 90% by weight of dibarium silicate and from 10 to 30% by weight of monobarium silicate, monobarium aluminate, tetrabarium ferrite aluminate, calcium-barium orthosilicate and barium-magnesium orthosilicate, with the proviso that the composition does not contain more than 8% monobarium silicate, nor more than 8% monobarium aluminate, nor more than 8% tetrabarium aluminate ferrite and not more than 12% of calcium-barium orthosilicate and magnesium-barium orthosilicate; in combination with a setting-retarder.

4. The composition of claim 3, wherein the setting retarder is 3 to 5% of calcium sulfate or gypsum.

5. The composition of claim 3, wherein the setting retarder is 3 to 5% of gypsum together with 5% bentonite.

* * * * *